UNITED STATES PATENT OFFICE.

DON C. WESTERFIELD, OF DAYTON, AND EDWARD J. ROGERS, OF MIAMISBURG, OHIO.

COMPOSITION FOR PROTECTING METALLIC SURFACES AGAINST CORROSION.

1,240,395.     Specification of Letters Patent.     Patented Sept. 18, 1917.

No Drawing.     Application filed March 2, 1917.     Serial No. 152,136.

*To all whom it may concern:*

Be it known that we, DON C. WESTERFIELD and EDWARD J. ROGERS, citizens of the United States, residing, respectively, at Dayton and Miamisburg, in the county of Montgomery and State of Ohio, have invented a new and useful Composition for Protecting Metallic Surfaces Against Corrosion, of which the following is a specification.

The principal object of our invention is to provide a new and useful composition of matter for the purpose of effectively cleaning metals at minimum cost. Our cleaning composition will not only thoroughly clean the metal subjected to its treatment, but in addition is adapted to efficiently remove rust from it before, and prevent the corrosion thereof after, paint has been applied.

While our new cleaning composition is applicable to all metals, it is particularly adapted for treating iron and steel which constitute the principal materials of which automobile bodies are made. It is extremely important that these bodies be cleaned and made corrosion proof by a composition or compound that can be cheaply made up and which at the same time possesses properties that are effective for the purposes to be accomplished. Likewise it is desirable that the composition be made up in such form that it can be put on the bodies by unskilled labor, to the end that the cost of its application may be reduced to the minimum.

That our composition satisfies the above requirements, it is believed, will be apparent from the following description of its component parts and the purpose of each in the combination.

By reason of its relative cheapness and excellent cleaning and solvent properties, it is our purpose to use acetone ($CH_3.CO.CH_3$) as one of the principal constituents of our cleaning composition. It is an excellent remover of grease, which, together with dirt, is nearly always present on automobile bodies. This is accounted for by the fact that an automobile body is frequently touched by greasy hands, and, after being in use, numerous particles of grease-laden dust are deposited upon it when the car is in motion. As an agent for removing this grease, acetone has been found by us to be very efficient.

Dirt and grease are not the only deleterious substances which should be removed from automobile bodies before they can be properly painted. Rust, which is formed on iron and steel when they are exposed in their unprotected state to moisture, should not only be removed from those metals before they are painted, but corrosion which frequently takes place under the paint, must be prevented. For the purpose of removing this rust, we prefer to employ orthophosphoric acid ($H_3PO_4$) which, when mixed with acetone, will not only dissolve the rust, but grease, dirt and other harmful substances as well.

In order that this composition may be made more effective as a rust-preventative after the metal has been painted, a fixing agent is required. In other words, the admixture of acetone and orthophosphoric acid should be made to form on the metal, a coating which is impervious to moisture. The fixing agent that we prefer for this purpose is shellac—a resin or gum which is readily soluble in acetone. The latter is not only an excellent solvent for resins, but the quantity required for that purpose is much less than that of a solvent such as alcohol, thereby reducing the cost of the composition.

Shellac, when dissolved in the acetone of our cleaning composition, will impart to the latter sufficient adhesive properties to cause it to spread over the surface of the metal in the form of a coating which is impervious to moisture. Therefore, after the paint has been applied, no rust will form under it. The shellac acts as a lacquer which, when it dries on the metal, forms a corrosion-proof coating for it.

Commercially, we prefer to make up our above described metal cleaning composition with water in the following proportions: acetone (by volume) 25%; orthophosphoric acid, 85% solution, (by weight) 24.1%; shellac (by weight) .5%; and water 50.4%, or a quantity thereof sufficient to make the composition 100% by volume.

After the metal has been treated with the above composition and wiped dry, it will present a thoroughly clean surface to the paint, which may then be applied without fear of rust forming under it.

Having described our invention, we claim:

1. A composition for protecting metallic surfaces against corrosion, consisting of orthophosphoric acid, a resin, a solvent for the resin, and water substantially in the proportions described.

2. A composition for protecting metallic surfaces against corrosion, consisting of orthophosphoric acid, shellac, a solvent for the shellac, and water substantially in the proportions described.

3. A composition for protecting metallic surfaces against corrosion, consisting of orthophosphoric acid, shellac, acetone, and water substantially in the proportions described.

In testimony whereof we have hereunto set our hands this 1st day of March, A. D. 1917.

DON C. WESTERFIELD.
EDWARD J. ROGERS.

Witnesses:
DANIEL BLAU,
HOWARD S. SMITH.